Jan. 21, 1969  D. C. EISENDRATH  3,422,745
LIQUID CONTROL APPARATUS
Original Filed Nov. 1, 1963  Sheet 1 of 3
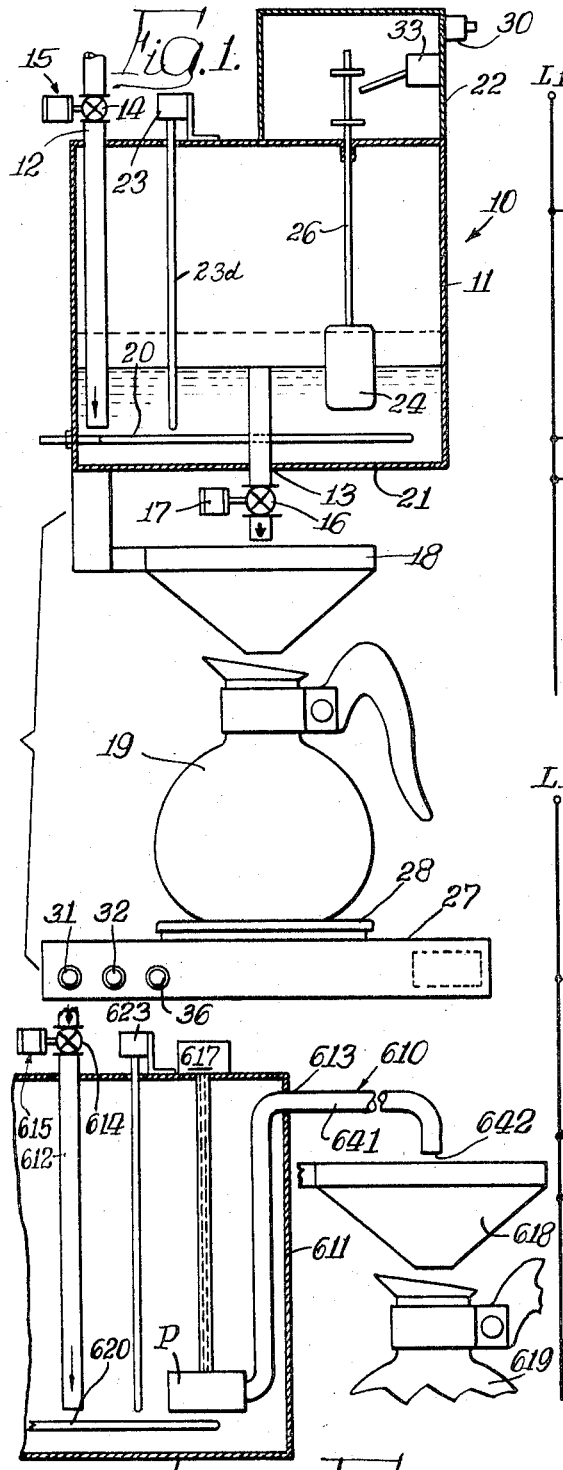
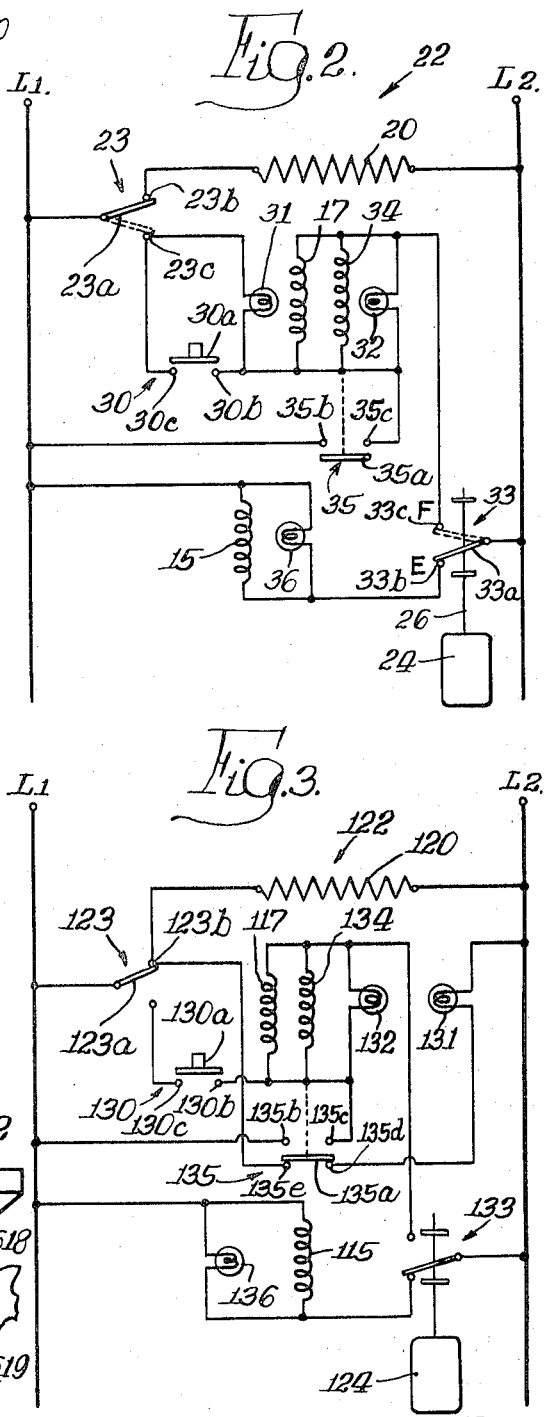
INVENTOR.
David C. Eisendrath
BY
Attys.

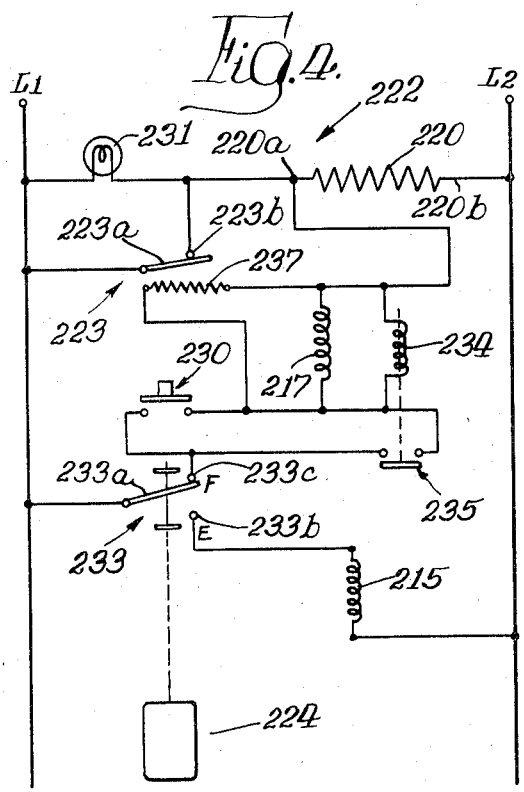
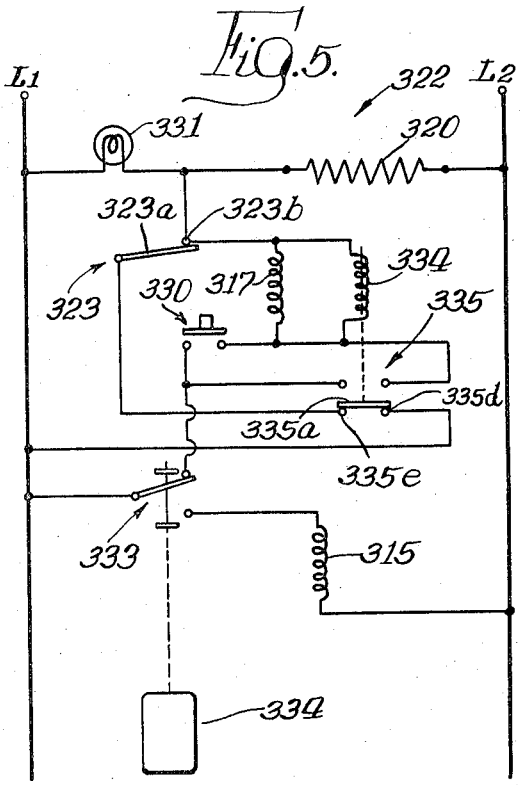
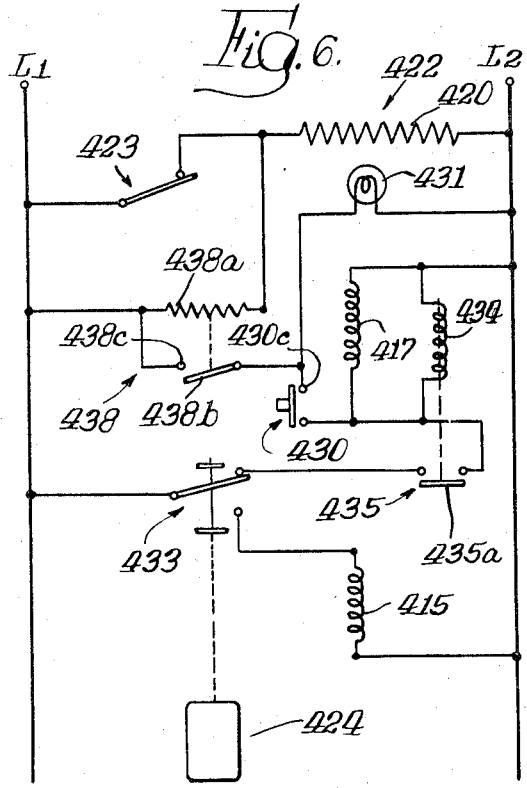
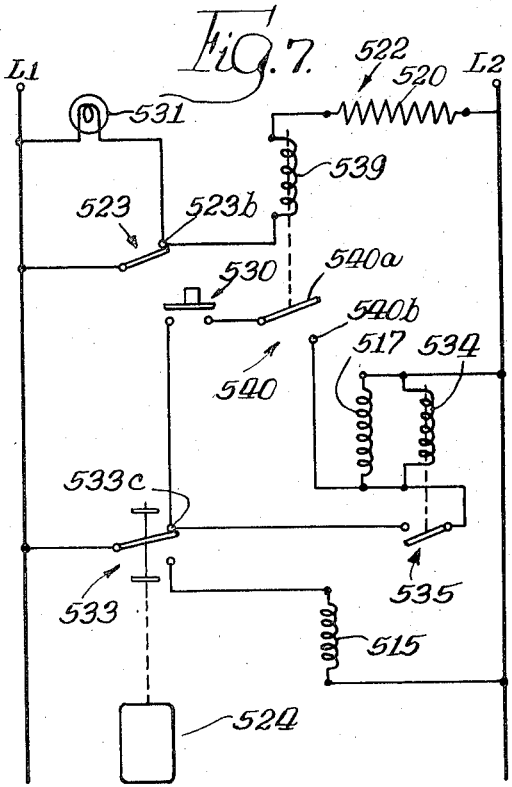

_United States Patent Office_

3,422,745
Patented Jan. 21, 1969

3,422,745
LIQUID CONTROL APPARATUS
David C. Eisendrath, Chicago, Ill., assignor to Cory Corporation, a corporation of Delaware
Continuation of application Ser. No. 320,746, Nov. 1, 1963. This application Mar. 8, 1967, Ser. No. 632,134
U.S. Cl. 99—282      24 Claims
Int. Cl. A23f 1/00

ABSTRACT OF THE DISCLOSURE

A liquid heater apparatus for providing a preselected quantity of liquid such as hot water for use such as brewing. The apparatus includes a tank, an inlet for conducting liquid into the tank, a first valve for controlling the flow of liquid through the inlet, an outlet for conducting liquid from the tank, a second valve, or a pump for controlling the flow of liquid through the outlet to a brewer or the like, means for heating the liquid in the tank, and thermostat means for selectively energizing the heating means. An electrical control permits opening of the outlet valve only when the level in the tank is at a preselected high level, maintains the outlet valve open until the liquid level reaches a preselected low level while said heating means may be selectively energized or de-energized, and concurrently closes the outlet valve and opens the inlet valve when the level of liquid in the tank reaches the preselected low level until the level of liquid in the tank reaches the preselected high level. A weight controlled station for carrying the decanter or the like to receive the brew and control the delivery.

Background of the invention

This is a continuation of my copending application, Ser. No. 320,746, filed Nov. 1, 1963, and entitled, "Liquid Control Apparatus" (now abandoned).

There has developed a need for a low-cost apparatus providing brewed beverages and the like such as for use in small dining facilities and restaurants and the like. The known apparatuses for such brewing purposes have the serious disadvantages of relatively high cost, complexity, difficulty of use, relatively large size, etc. The present invention comprehends an improved apparatus providing liquid such as hot water in accurately preselected amounts for use in such brewing operations.

Summary of invention

A principal object of the present invention is the provision of a new and improved liquid control apparatus.

Another object of the invention is the provision of such apparatus providing a preselected quantity of liquid.

A further object of the invention is the provision of such apparatus providing a preselected quantity of hot liquid such as for use in brewing operations.

Still another object of the invention is the provision of such apparatus comprising a tank, an inlet for conducting liquid into the tank, first valve means for controlling flow of liquid through the inlet, an outlet for conducting liquid from the tank, second valve means for controlling flow of liquid through the outlet, and control means selectively operable (a) to permit opening of the second valve means only when the level of liquid in the tank is at a preselected high level, (b) to subsequently maintain the valve means open until the level reaches a preselected low level, and (c) to concurrently close the second valve means and open the first valve means when the level of liquid in the tank reaches the preselected low level, the control means further being arranged to maintain the first valve means open until the level of liquid in the tank reaches the preselected high level.

Yet another object of the invention is the provision of such apparatus including new and improved electrical control means.

Another object of the invention is the provision of such apparatus including means for heating the liquid in the tank wherein the control means includes means resposive to the temperature of the liquid in the tank.

A yet further object of the invention is the provision of such apparatus including improved control means for indicating the condition of the liquid such as the temperature condiion thereof.

A further object of the invention is the provision of such apparatus wherein the means controlling the flow of liquid through the outlet comprises a pump means for delivering the liquid to a preselected discharge point which may be above the level of the bottom of the tank.

Other features and advantages of the invention will be apparent from the following description taken in connection with the accompanying drawings.

Description of drawings

FIG. 1 is a front elevation of an apparatus embodying the invention with the tank being shown in section to illustrate the arrangement of the flow control therein;

FIG. 2 is a schematic electrical diagram illustrating the circuit of one form of the apparatus;

FIG. 3 is a schematic electrical diagram illustrating the circuit of another form of the apparatus;

FIG. 4 is a schematic electrical diagram illustrating the circuit of still another form of the apparatus;

FIG. 5 is a schematic electrical diagram illustrating the circuit of yet another form of the apparatus;

FIG. 6 is a schematic electrical diagram illustrating the circuit of a further form of the apparatus;

FIG. 7 is a schematic electrical diagram illustrating the circuit of a yet further form of the apparatus;

FIG. 8 is a fragmentary elevation of another form of the apparatus;

Detailed description of invention

Figure 9:
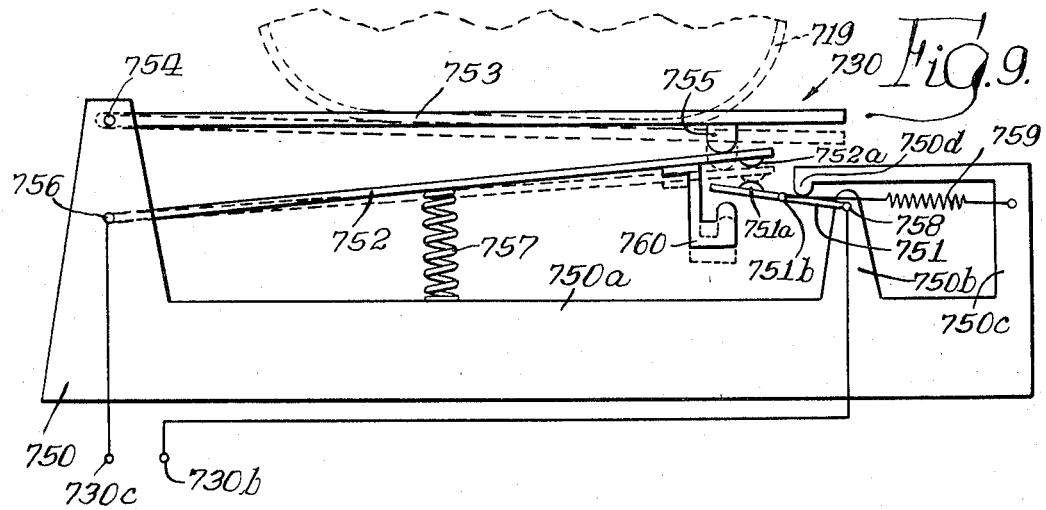
FIG. 9 is a fragmentary elevation of a switch mechanism which may be used as a portion of the control; the switch being shown in the normally open position in full lines, and in a transition closed position in dotted lines.

In the exemplary embodiment of the invention as disclosed in FIGS. 1 and 2 of the drawing, a liquid control apparatus, generally designated 10, includes a tank 11 having an inlet 12 and an outlet 13. Liquid such as cold water is delivered through the inlet 12 into the tank, the flow of the liquid through the inlet 12 being controlled by a suitable conventional valve 14 operated by a conventional solenoid 15. The flow of liquid from the tank through outlet 13 is controlled by a suitable conventional valve 16 controlled by a solenoid 17.

The invention is herein described in connection with an apparatus 10 arranged for delivering hot water to a brewing device 18 wherein a beverage such as coffee is brewed and then delivered to a subjacent decanter 19. For this purpose a conventional electrical heating element 20 is disposed in the tank 11 adjacent the bottom wall 21 thereof. The operation of apparatus 10 is regulated by a control 22 which includes the electrical circuitry arranged to control the operation of solenoids 15 and 17 and heating element 20. A thermostatic switch 23 is provided for sensing the temperature of the water in the tank 11 and is suitably connected to the control 22, as will be discussed hereinafter in greater detail, to regulate the operation of the apparatus as a function of the temperature of the water. A float 24 is disposed within the tank 11 to provide a level signal to the control 22 through an interconnecting link 26 having a pair of vertically spaced collar stops 26a and 26b adjustably threaded thereon.

The decanter 19 is normally disposed subjacent the brewing device 18 on a suitable conventional stand 27 which includes a heating element 28 for maintaining the brew within decanter 19 at a preselected temperature. As shown in FIG. 1, a control switch 30 may be carried on control 22 for operation by the user to initiate a brewing cycle. Stand 27 is provided with a plurality of signal lights, herein three signal lights 31, 32 and 36, for suitably signalling the operation of the apparatus, as will subsequently be discussed in greater detail.

The operation of apparatus 10 may best be seen by reference to FIG. 2 illustrating the electrical circuitry of control 22. The control includes a snap switch 33 having a movable contact 33a operated selectively by the stops 26a and 26b on link 26 for selective engagement with a first fixed contact 33b and a second fixed contact 33c of the switch 33. As shown in FIG. 2, switch 33 comprises a level switch which, when the float 24 is in its lowermost position, as when the level of water in tank 11 is at the preselected low, or "Empty," level, has its contact 33a closed with the lower fixed contact 33b. Solenoid 15 is connected between the fixed contact 33b and one power supply lead $L_1$. Moving contact 33a of switch 33 is connected to the other power supply lead $L_2$, whereby a completed circuit is established through switch 33 when the level of the water in the tank 11 is at a preselected low level. The energization of the solenoid opens valve 14 to admit cold water into the tank through the inlet 12. When the level of the water in the tank reaches the preselected upper, or "Full," level the lower stop 26a on link 26 snaps switch contact 33a upwardly to close with fixed contact 33c, instantaneously breaking the circuit to the solenoid 15. Thus, no further water is delivered to the tank at this time.

The temperature of the water in the tank is sensed by the snap action thermostat switch 23 which includes a moving contact 23a, a first fixed contact 23b and a second fixed contact 23c. When the temperature of the water in the tank is below the preselected desired brewing temperature, the switch contact 23a is in its upper position, as shown in FIG. 2, in contact with fixed contact 23b which is connected to the heating element 20. The heating element in turn is connected to power supply lead $L_2$ and the switch 23a is in turn connected to the power supply lead $L_1$, thereby providing a completed circuit to the heating element.

Energization of the heating element 20 raises the temperature of the water in the tank 11 until the temperature reaches a preselected high temperature, such as the desired brewing temperature. When the water reaches this temperature the thermostat switch contact 23a is thrown from contact 23b to contact 23c, thereby de-energizing the heating element and establishing a circuit from power supply lead $L_1$ to contact 23c. In series between contact 23c of switch 23 and contact 33c of switch 33 is a parallel combination of the signal light 31 and the switch 30 and a parallel combination of outlet solenoid 17, relay coil 34, and second signal light 32. Further in parallel with the series circuit of switch 23 and the parallel combination of signal light 31 and switch 30 is a normally open switch 35 having a moving contact 35a and fixed contacts 35b and 35c. As shown in FIG. 2, contact 35b is connected to power supply lead $L_1$, and thus when relay coil 34 is energized, moving contact 35a closes between contacts 35b and 35c to provide a holding circuit around switches 23 and 30.

The signal lights 31 and 32 function as follows. When the thermostat switch 23 is closed with fixed contact 23c and the fill switch contact 33a is closed with fixed contact 33c, the voltage between leads $L_1$ and $L_2$ is applied between contacts 23c and 33c. The resistance, however, of solenoid 17 and relay coil 34 is relatively low as compared to the relatively high resistance of lamp 32, and, thus, only lamp 31 is illuminated. The resistance of lamp 31 is relatively high so that neither the solenoid 17 nor coil 34 is sufficiently energized to open valve 16 or close switch 35 respectively. Thus, signal light 31 comprises a "Water Ready" light which will indicate to the user that the water in tank 11 is hot and that brewing may be commenced by depressing the pushbutton 30.

When the user depresses the pushbutton 30, the signal light 31 is shorted out and full line voltage is impressed directly across the parallel connection of the solenoid 17, relay coil 34 and signal light 32. This causes signal light 32 to become illuminated. Thus, signal light 32 comprises a "Start Brew" indicator, signalling to the user that the brewing operation has been initiated. The signal light 32 will remain illuminated as long as the holding switch 35 is closed to maintain the output solenoid valve 17 energized to deliver the hot water to the brewing cartridge.

As indicated above, to initiate brewing the user need merely depress the "Start Brew" switch 30 momentarily to close the moving contact 30a thereof with the fixed contacts 30b and 30c, thereby connecting contact 23c of switch 23 directly to the parallel combination of solenoid 17, relay coil 34 and signal light 32. This further energizes the outlet solenoid 17 to open the valve 16 and initiate delivery of the hot water from the tank 11 to the brewing device 18. At the same time, relay coil 34 is energized to close moving contact 35a with fixed contacts 35b and 35c to establish the holding circuit around switches 23 and 30. Thus, the outlet solenoid is continuously energized notwithstanding cooling of the water in the tank during the brewing operation.

Delivery of the hot water to the brewing device through outlet 13 continues until the float 24 reaches the preselected low level, whereupon the upper stop 26b snaps switch 33 from the dotted line position to the full line position of FIG. 2, thereby breaking the circuit to the outlet solenoid 17, the relay coil 34, and the "Start Brew" light 32. At the same time, the throwing of the contact 33a of switch 33 to fixed contact 33b establishes the circuit from power supply lead $L_2$ to the input valve solenoid 15, thereby causing the valve 14 to open and deliver cold water into the tank 11. Delivery of the cold water is continued until the float 24 again rises to the upper preselected level, whereupon the lower stop 26a on the link 26 snaps the switch contact 33a away from contact 33b to discontinue further delivery of the cold water. The switch contact 33a is snapped back to engagement with contact 33c, thereby re-establishing the circuit for initiation of a subsequent brewing operation by the above described operation. The third signal light 36 is connected in parallel with the input of the inlet solenoid valve 15 so as to provide an indication to the user of the refilling of the tank.

The thermostat 23 includes a probe portion 23d which extends downwardly through the top of the tank 11 to slightly above the heating element 20. To assure the presence of a body of water in the tank at all times above the heating element 20, the outlet 13 includes a standpipe portion 13a extending upwardly from the bottom wall 21 to above the level of the heating element 20. The stop 26b is adjusted on link 26 so as to effect the above described termination of the brewing cycle and initiation of the refilling of the tank when the level of the water in the tank reaches a low level somewhat above the upper end of the standpipe 13a. Thus, in the event of a lowering of the level of the water in the tank, such as due to evaporation or the like where the tank stands for long periods of time, the tank is automatically refilled when the level decreases to the point where the stop 26b throws the switch 33. In the event of a malfunctioning of the outlet valve 16, the level of water in the tank is always maintained above the heating element 20, so that the thermostat switch 23 will function to discontinue the heating operation and prevent a burn-out of the heating element.

Thus, the apparatus 10 is extremely simple, utilizing only inlet and outlet solenoid valves and a single relay in combination with the float, thermostat and "Start Brew" switches to obtain an automatic control of the brewing operation and resetting of the apparatus for subsequent brewing operations. The control is arranged so that the operator cannot initiate a brewing operation until the water is at the proper brewing temperature and at the proper volume level in the tank, this condition being signalled by the illumination of "Water Ready" signal light 31. The brewing continues notwithstanding a fluctuation of the temperature of the water in the tank, and the tank is automatically refilled immediately after delivery of hot water to the brewing device is completed.

A number of modifications of the control 22 are illustrated in FIGS. 3 through 8. Each of the controls illustrated therein is generally similar to control 22, but includes certain variations, as discussed in detail relative to each circuit. To facilitate disclosure of the invention, the components of the various modified controls are designated by numerals similar to, but one or more hundreds higher than, the numerals applied to the corresponding components of control 22.

Referring now to FIG. 3, a modified form of the invention is shown to include a control 122, which is generally similar to control 22 except that the signal light 131 is connected from power supply lead $L_2$ to a fixed contact 135d of a double throw relay switch 135. The moving contact 135a of the switch 135 is normally closed between contact 135d and a second fixed contact 135e, which is connected to the thermostat switch contact 123b. The switch 135 further includes a pair of fixed contacts 135b and 135c which contact 135a closes between when the relay coil 134 is energized. Thus, when the thermostat switch 123 is in the "cold" position with the moving contact 123a thereof closed with fixed contact 123b to energize the heating element 120, the signal light 131 is energized to indicate the heating of the water in the tank, as it is connected in parallel with the heating element 120 through the contact 135a which is closed with contacts 135d and 135e. When the relay coil 134, however, is energized subsequently, the moving contact 135a moves from contacts 135d and 135e to break the circuit to the signal light 131 and establish the holding circuit discussed above relative to control 22. In all other respects the control 122 is similar to control 22.

Referring now to FIG. 4, another modified form of the invention is disclosed wherein the control, generally designated 222, includes a heater 237 comprising a small low wattage element which, when energized, maintains the bimetallic creep-type thermostat switch contact 223a spaced from the fixed contact 223b to discontinue energization of the heating element 220. The signal light 231 is connected in parallel with thermostat switch 223 so that the light is shorted out when the heating element 220 is energized, and illuminated when the switch 223 is opened to de-energize the heating element 220. The heater 237 is connected in series with the heating element 220 and the switch 230 or holding switch 235, to the fixed contact 233c of the level switch 233. The heater 237 is further connected in parallel with the outlet solenoid 217 and the relay coil 234. The holding switch 235 is connected in parallel with the switch 230.

Thus, in apparatus 222 initiation of the brewing operation is effected by the momentary closing of switch 230. The closing of switch 230 establishes a circuit from power supply lead $L_1$ through level switch 233 and to the series connection of the heater 237 and heating element 220, thereby energizing the heater 237 to maintain the thermostat contact 223a spaced from the fixed contact 223b and preclude further effective heating of the water in the tank by the heating element 220. In this connection, it should be noted that the resistance of the heating element 220 is relatively low as compared with the impedance of solenoid 217, heater 237, and relay coil 234 so as to effectively comprise a direct connection to the power supply lead $L_2$ relative to the heater 237, solenoid 217, and relay coil 234. Thus, when switch 230 is closed, the relay coil 234 is concurrently energized to close the switch 235 and thereby hold the circuit from level switch contact 233c to the outlet solenoid 217 and relay coil 234. Putting it another way, when the thermostat switch contact 223a is closed with fixed contact 223b, then, and only then, is it not possible to energize the output solenoid 217, relay coil 234, and thermostat switch heater 237 by closing manually operable pushbutton switch 230. Thus, as long as the temperature of the water is not up to the preselected brewing temperature, the user cannot initiate a brew cycle.

Thus, in apparatus 222, the hot water is delivered from the tank in a manner similar to the delivery described relative to control 22 and until the float 224 drops to the lowermost or "Empty" level, whereupon the switch contact 233a of switch 233 snaps to the lowermost position of FIG. 4 and into engagement with fixed contact 233b to energize the inlet solenoid 215 for refilling the tank.

Referring now to FIG. 5, a further modified form of the control apparatus 322 is shown to comprise a circuit generally similar to that of FIG. 4 except that the moving contact 323a of the bimetallic creep-type thermostat switch 323 is connected to a fixed contact 335e of a double pole double throw switch 335 controlled by the relay coil 334. The switch 335 includes a second fixed contact 335d and moving contact 335a which is normally closed between contacts 335e and 335d so as to provide a circuit from power supply lead $L_1$ through the switch 335 to the thermostat switch 323 and through the thermostat switch to the heating element 320. Thus, conrol 322 eliminates the heater 237 and substitutes therefor the second set of fixed contacts 335e and 335d of the switch 335 which functions to prevent interruption of the brew cycle which would otherwise occur when thermostat switch 323 closes as a result of a lowering of the temperature of the water in the tank. In all other respects, the control 322 functions exactly similarly to the control 222.

Turning now to FIG. 6, a further modified form of control 422 is shown to comprise a control having a second thermally energized switch generally designated 438 having a heater 438a connected in parallel with the thermostat switch 423. Switch 423, when closed, shorts out the heater 438a. The opening of switch 423, when the temperature of the water in the tank 11 reaches the preselected high level, permits the relatively high resistance heater 438a to be energized as it is connected in series with the relatively low resistance heating element 420. After a short time, the heater 438a causes a bimetallic actuated moving contact 438b associated therewith to close with a fixed contact 438c, and thereby provide a circuit from power supply lead $L_1$ when the switch 430 430c of the "Start Brew" switch 430 which is in series with the electrically pralleled outlet solenoid 417 and relay coil 434. The solenoid 417 and coil 434 are in turn connected to the power supply lead $L_2$ to complete the circuit from power supply lead $L_1$ when the switch 430 is closed. The signal light 431 is connected from contact 430c to the power supply lead $L_2$ to be energized when the thermal switch 438 closes, thereby signalling the fact that hot water is ready to be delivered. The solenoid coil 434 controls the movable contact 435a of the holding switch 435, as discussed above relative to the previously described circuits, to provide a holding circuit from the level switch 433 to the solenoid 417 and relay coil 434.

Referring now to FIG. 7, still another modified form of control 522 is shown to comprise a circuit closely similar to that of FIG. 4, but having a low impedance relay coil 539 connected between heating element 520 and the fixed contact 523b of the bimetallic actuated creep-type thermostat switch 523. The relay coil 539 operates the moving contact 540a of a switch 540 having a fixed contact 540b connected to the paralleled outlet solenoid 517 and relay coil 534. The moving contact 540a of switch 540 is connected through the switch 530 to the fixed contact 533c of the level switch 533 to complete the circuit to the power supply lead L₁ when the level switch 533 is closed with contact 533c. Thus, thermostat, switch 523 may comprise a conventional creep-type thermostat switch, wherein the outlet solenoid 517 cannot be energized until the relay switch 540 closes as a result of a positive opening of the thermostat switch 523. However, once energized, solenoid 517 will remain energized to the completion of the hot water delivery, regardless of the de-energization of coil 539.

In each of the circuits illustrated in FIGS. 2 through 7, the control of the delivery of hot water from tank 11 is shown to be by means of a solenoid arranged to control the opening and closing of an outlet valve such as outlet valve 16 illustrated in FIG. 1. Such a delivery arrangement is fully satisfactory where the brewing device and the decanter 19 may be disposed subjacent the outlet 13. However, the invention comprehends a further modification permitting the delivery of the hot water to discharge points other than subjacent the tank 11. This structural concept is illustrated in FIG. 8 wherein a pump P is substituted for the outlet valve and a pump motor 617 is substituted for the outlet solenoid. The pump P delivers the hot water from the tank 611 through a conduit 641 to a discharge point 642 which is illustratively disposed laterally of the tank 611 and above the bottom wall 621 thereof. Thus, for example, the brewing device 618 and decanter 619 receiving the brewed beverage from the device 618 may be disposed alongside, or above, the tank rather than under the tank, permitting a generally unrestricted arrangement of the apparatus 610 in lieu of the gravity arrangement of apparatus 10 illustrated in FIG. 1. It is obvious that the motor 617 may be substituted for the outlet solenoids 17 through 517 of the respective embodiments of FIGS. 2 through 7.

Figure 10:
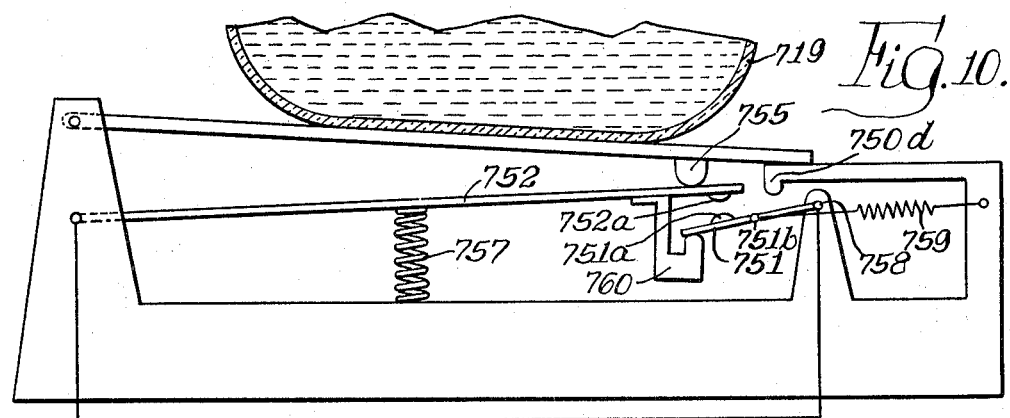
FIG. 10 is a view similar to that of FIG. 9, but with the switch as arranged in an open thrown position.
Figure 11:
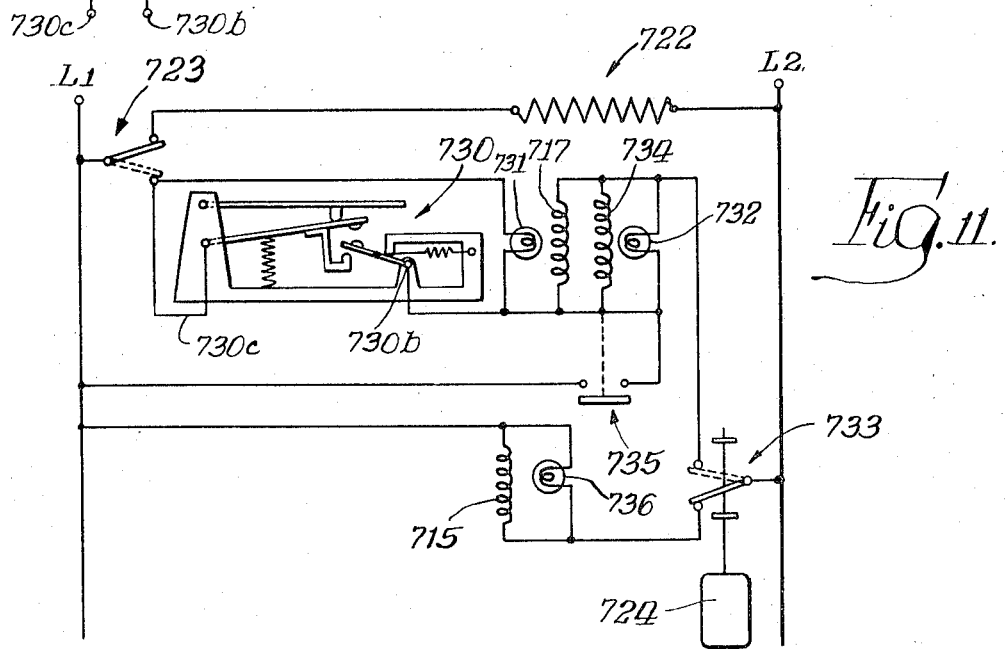
FIG. 11 is a schematic electrical diagram illustrating the use of the switch of FIGS. 9 and 10 in lieu of the manual pushbutton switch of FIG. 2.

Turning now to FIGS. 9 and 10, a further modification of the control system is shown to comprise a switch 730 which may be substituted for the "Start Brew" switches 30 through 530 of the circuits illustrated in FIGS. 2 through 7. More specifically, switch 730 is carried on an insulated frame 750 and includes a first switch arm 751, a second switch arm 752, and a decanter platform 753. The decanter platform 753 is mounted on the frame 750 at one end by a pivot 754 permitting an insulating actuator button 755 on the distal end of the platform to move alternatively upwardly and downwardly above the switch arms 751 and 752. The switch arm 752 is carried on the frame below the platform 753 by a pivot 756 and is biased upwardly by a compression spring 757 extending between the arm 752 and a horizontal base portion 750a of the frame. The switch arm 752 carries at its distal end a contact 752a, and the switch arm 751 carries adjacent its distal end a contact 751a adapted to be contacted by the contact 752a when the switch arm 752 is pivoted in a clockwise direction, as seen in FIG. 9, as by the placement of an empty decanter on platform 753 to urge the actuator 755 downwardly against the distal end of the switch arm 752. The switch arm 751 is carried on an upright portion 750b of the frame by a pivot 758 and is urged selectively upwardly and downwardly by a toggle spring 759 connected at one end to a right-hand end portion 750c of the frame, and at its opposite end to a center portion 751b of the switch arm 751. Thus, spring 759 throws the switch arm 751 selectively upwardly against a stop 750d carried on the frame portion 750c, and downwardly against a stop 760 depending from the switch arm 752 to underlie the distal end of the switch arm 751.

Each of the switch arms 751 and 752 are conductive. Thus, the pivots 756 and 758 may comprise the respective fixed contacts of the "Start Brew" switch 730, and thus may define respectively the terminals 730c and 730b of the switch.

To illustrate the functioning of switch 730, we may consider the switch 730 is employed in the circuit 22 of FIG. 2, in lieu of the manually operable pushbutton switch 30. Thus, when the user wishes to initiate a brewing cycle with switch 730 being employed as the "Start Brew" switch in control 22, he merely places a decanter on the platform 753. The weight of the decanter causes the platform to pivot downwardly in a clockwise direction, as seen in FIG. 9, to engage contact 752a with contact 751a to complete the circuit between terminals 730c and 730b. This causes the energization of relay coil 34 to close the switch contact 35a of switch 35 with fixed contacts 35b and 35c to provide the holding circuit described above relative to circuit 22.

As the weight of brewed liquid is added to the weight of the decanter on platform 753, the platform movement continues further downwardly to a position where the spring 759 moves under the switch arm 751 and snaps it in a counterclockwise direction against the stop 760 to space the contact 751a from contact 752a. Thus, the circuit is broken between fixed contact 730c and 730b, but the circuit to the solenoid 17 and relay coil 34 is maintained by the closing of contact 35a between contacts 35b and 35c of the holding switch 35.

At the completion of the brewing cycle, the "Fill" switch 33 causes the tank to refill. However, the removal of the full decanter from the platform will not cause the initiation of a subsequent brewing cycle, as when the decanter is removed from the platform the spring 757 will return the switch arm 752 to the uppermost position of FIG. 9, and the stop 760 will throw the switch arm 751 to its uppermost position against the stop 750d with the contacts 751a and 752a being maintained spaced apart, as shown in FIG. 9. Thus, the circuit between the fixed contacts of the switch is maintained open and reclosing thereof may only be effected by placement of a decanter on the platform as for receiving a subsequent quantity of beverage.

Thus, the invention disclosed herein comprehends an improved simplified liquid control apparatus providing a preselected quantity of liquid such as hot water from a tank for use in a process such as the brewing of a beverage. The controls of the different embodiments provide improved functioning and simplified construction permitting facilitated seriatim operation of the apparatus wherein automatic refilling of the tank is obtained. Thus, accelerated re-establishment of the apparatus for subsequent brewing operations is obtained. Further, the invention comprehends an arrangement permitting the disposition of the brewing and receiving means as desired, such as below or laterally of the hot water tank, as well as at any other desired point.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. Apparatus for providing a preselected quantity of heated liquid comprising: a tank; an inlet for conducting liquid into the tank; first valve means for controlling flow of liquid through said inlet; an outlet for conducting liquid from the tank; second valve means for controlling flow of liquid through said outlet; means for heating liquid in said tank; means responsive to the temperature of the liquid in the tank selectively operable to energize said heating means at all times including when said second valve means is open and when the liquid in the tank is below a preselected one of a plurality of high temperatures below the boiling temperature and deenergize said heating means when the temperature rises to said preselected high temperature and to permit opening of said second valve means only when the temperature of the liquid in said tank reaches said preselected high temperature; and electrical control means selectively operable (a) to permit opening of said second valve means only when the level of liquid in the tank is at a preselected high level,
(b) to subsequently maintain said second valve means open until the level reaches a preselected low level with said heating means being selectively energized or deenergized, and
(c) to concurrently close said second valve means and open said first valve means when the level of liquid in the tank reaches said preselected low level, said control means further being arranged to maintain said first valve means open until the level of liquid in the tank reaches said preselected high level.

2. The apparatus of claim 1 wherein said temperature responsive means includes a thermostat switch selectively making and breaking a circuit to said heating means.

3. The apparatus of claim 1 wherein said temperature responsive means includes a thermostat switch selectively shorting out said control means whenever the heating means is being energized.

4. The apparatus of claim 1 wherein said temperature responsive means includes a thermostat switch selectively shorting out said control means whenever the heating means is being energized, and said control means includes means preventing said thermostat switch from providing the circuit to said heating means when the control means is energized.

5. The apparatus of claim 1 wherein said temperature responsive means includes a thermostat switch selectively shorting out said control means whenever the heating means is being energized, and said control means includes a heater affecting said thermostat switch to prevent said thermostat switch from providing the circuit to said heating means when the control means is energized.

6. The apparatus of claim 1 wherein said temperature responsive means includes a thermostat switch, and said control means includes an electrical signal device connected in series with said thermostat switch for signalling the temperature condition of the liquid.

7. The apparatus of claim 1 wherein said temperature responsive means includes a thermostat switch, said control means includes an electrical signal device connected in parallel with said heating means for signalling the temperature condition of the liquid.

8. The apparatus of claim 1 wherein said temperature responsive means includes a thermostat switch selectively shorting out said control means whenever the heating means is being energized and said control means includes switch means in series with said thermostat switch precluding shorting out of the control means upon energization of said control means.

9. The apparatus of claim 1 wherein said temperature responsive means includes a thermostat switch selectively shorting out said control means whenever the heating means is being energized, and said control means includes switch means in series with said thermostat switch precluding shorting out of the control means upon energization of said control means and holding the control means energized until the level of liquid in said tank reaches said preselected low level.

10. The apparatus of claim 1 wherein said temperature responsive means includes a thermostat switch selectively making and breaking a circuit to said heating means, a heater connected in series with said heating means and in parallel with said thermostat switch, and a control switch connected in series with said control means and responsive to energization of said heater, as a result of the opening of said thermostat switch, to permit energization of said control means.

11. The apparatus of claim 1 wherein said temperature responsive means includes a thermostat switch selectively making and breaking a circuit to said heating means, a heater connected in series with said heating means and in parallel with said thermostat switch, and a control switch connected in series with said control means and responsive to energization of said heater, as a result of the opening of said thermostat swtich, to permit energization of said control means, said control means including a signal device connected in series with said control switch to signal the opening of said thermostat switch.

12. The apparatus of claim 1 wherein said temperature responsive means includes a thermostat switch selectively making and breaking a circuit to said heating means, said control means including a relay having a coil connected in series with said thermostat switch and contacts connected in series with said control means to be closed as a result of a de-energization of said coil and thereby permit energization of said control means.

13. The apparatus of claim 1 wherein said temperature responsive means includes a thermostat switch selectively making and breaking a circuit to said heating means, said control means including a relay having a coil connected in series with said thermostat switch and said heating means and contacts connected in series with said control means to be closed as a result of a de-energization of said coil and thereby permit energization of said control means.

14. The apparatus of claim 1 wherein said temperature responsive means includes a thermostat switch selectively making and breaking a circuit to said heating means, said control means including a relay having a coil connected in series with said thermostat switch and contacts connected in series with said control means to be closed as a result of de-energization of said coil and thereby permit energization of said control means, and a signal device connected in parallel with said thermostat switch for signalling the closing of said contacts.

15. Apparatus for providing a preselected quantity of brew comprising: a tank; an inlet for conducting liquid into the tank; first means for controlling flow of liquid through said inlet; an outlet for conducting liquid from the tank; second means for controlling flow of liquid through said outlet; means for heating liquid in said tank; means responsive to the temperature of the liquid in the tank selectively operable to energize said heating means at all times including when said second means is actuated when the liquid in the tank is below a preselected one of a plurality of high temperatures below the boiling temperature and de-energize said heating means when the temperature rises to said preselected temperature and to permit actuation of said second means to provide flow of liquid through said outlet only when the temperature of the liquid in said tank reaches said preselected high temperature; control means selectively operable (a) to permit actuation of said second means only when the level of liquid in the tank is at a preselected high level,
(b) to subsequently maintain actuation of said second means until the level reaches a preselected low level with said heating means being selectively energized or de-energized, and
(c) to concurrently deactuate said second means and actuate said first means to cause flow of liquid through said inlet when the level of liquid in the tank reaches said preselected low level, said control means further being arranged to maintain said first means actuated until the level of liquid in the tank reaches said preselected high level; and brewing means disposed to receive liquid delivered from said outlet for brewing therein.

16. The apparatus of claim 15 wherein said second means comprises a pump arranged to forcibly transfer liquid from the tank through the outlet to a preselected discharge point, said brewing means being disposed at said discharge point.

17. The apparatus of claim 15 wherein said second means comprises a pump arranged to forcibly transfer liquid from the tank through the outlet to a preselected discharge point above the level of the bottom of the tank, said brewing means being disposed at said discharge point.

18. The apparatus of claim 15 further including means for carrying a portable receptacle to receive the liquid conducted from the tank.

19. The apparatus of claim 18 wherein said means for carrying a receptacle includes a switch mechanism providing
(a) a momentarily closed circuit as the receptacle is placed thereon,
(b) a subsequent open condition of the circuit as the receptacle is permitted to move downwardly thereon, and
(c) a maintained open condition of the circuit when the receptacle is removed therefrom.

20. The apparatus of claim 18 wherein said means for carrying a receptacle includes a switch mechanism providing
(a) a momentarily closed circuit as the empty receptacle is placed thereon,
(b) a subsequent open condition of the circuit as the receptacle is permitted to move downwardly thereon as a result of the delivery of the liquid into the receptacle, and
(c) a maintained open condition of the circuit when the receptacle is removed therefrom.

21. Apparatus comprising: means for delivering liquid to a discharge point; means for carrying a portable receptacle to receive liquid at said discharge point; and means for controlling flow of liquid through said delivering means including electrically operable flow control means associated with said delivering means, a switch, and switch actuating means responsive to the weight of an empty receptacle on said carrying means to cause operation of the switch to effect delivery of the liquid to the discharge point, and as the result of the delivery of said liquid into said receptacle to prevent a subsequent operation of the swtich until after the receptacle is removed.

22. The apparatus of claim 21 wherein said switch comprises first and second switch arms, contacts on said arms, and spring means urging said first switch arm to space the contact thereon from the contact on the second arm, and urging the second switch arm to move the contact thereon selectively toward and away from the contact on said first arm, and said actuating means includes means to urge said second arm toward said first arm when said spring means urges said first arm to a position of maximum spacing of the contact thereon from the contact on said second arm.

23. The apparatus of claim 21 wherein said switch provides a momentarily closed condition when moved from a first open position to a second open position and a maintained open condition when moved from said second position to said first position.

24. The apparatus of claim 21 wherein said switch comprises a toggle-type switch having a momentarily closed condition when moved from a first open position to a second open position and a maintained open condition when moved from said second position to said first position.

References Cited
UNITED STATES PATENTS

| | | |
|---|---|---|
| 2,013,172 | 9/1935 | Petrone. |
| 2,367,851 | 1/1945 | Eaton. |
| 2,488,817 | 11/1949 | Kaminky. |
| 2,568,840 | 9/1951 | Zees. |
| 2,666,379 | 1/1954 | Kaminky. |
| 2,737,880 | 3/1956 | Johnson. |

ROBERT W. JENKINS, *Primary Examiner.*